(12) United States Patent
Himler et al.

(10) Patent No.: US 12,495,013 B2
(45) Date of Patent: Dec. 9, 2025

(54) INTERACTIVE EMAIL WARNING TAGS

(71) Applicant: Proofpoint, Inc., Sunnyvale, CA (US)

(72) Inventors: Alan James Himler, Pittsburgh, PA (US); Mark Wuslich, Aliquippa, PA (US); Sharankumar Hiremath, Campbell, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 807 days.

(21) Appl. No.: 17/480,430

(22) Filed: Sep. 21, 2021

(65) Prior Publication Data
US 2023/0086556 A1  Mar. 23, 2023

(51) Int. Cl.
| | |
|---|---|
| *H04L 9/40* | (2022.01) |
| *G06N 5/022* | (2023.01) |
| *G06Q 10/107* | (2023.01) |
| *H04L 51/212* | (2022.01) |

(52) U.S. Cl.
CPC ........... *H04L 51/212* (2022.05); *G06N 5/022* (2013.01); *G06Q 10/107* (2013.01); *H04L 63/1441* (2013.01)

(58) Field of Classification Search
CPC ... H04L 51/212; H04L 63/1441; G06N 5/022; G06Q 10/107
See application file for complete search history.

(56) References Cited

U.S. PATENT DOCUMENTS

| | | | |
|---|---|---|---|
| 11,757,914 B1* | 9/2023 | Jakobsson | H04L 51/42 726/25 |
| 2016/0057167 A1 | 2/2016 | Bach | |
| 2019/0132273 A1* | 5/2019 | Ryan | H04L 63/1483 |
| 2019/0319905 A1 | 10/2019 | Baggett et al. | |
| 2022/0210188 A1* | 6/2022 | Grewal | H04L 63/1483 |

FOREIGN PATENT DOCUMENTS

EP  3699796 A1  8/2020

OTHER PUBLICATIONS

Apr. 7, 2022—(EP) Extended Search Report—App 21206319.2.

* cited by examiner

*Primary Examiner* — Izunna Okeke
(74) *Attorney, Agent, or Firm* — Banner & Witcoff, Ltd.

(57) ABSTRACT

Aspects of the disclosure relate to providing a flexible and automated system for automatically detecting when emails include harmful content, flagging the emails, providing interactive reporting functionality, and providing follow-up enforcement actions to protect users. A computing platform may intercept an email in transit to an email server. Subsequently, the computing platform may analyze the email and generate at least one unique link for reporting suspicious content associated with the email. Next, the computing platform may generate an email warning tag comprising text information and the at least one unique link for reporting the suspicious content associated with the email. Then, the computing platform may inject the email warning tag into the email to produce a modified email comprising content from the email and the email warning tag, and may send the modified email to the email server.

19 Claims, 7 Drawing Sheets

INTERACTIVE EMAIL WARNING TAGS

TECHNICAL FIELD

Aspects of the disclosure relate to cybersecurity. In particular, one or more aspects of the disclosure relate to providing information about potential cybersecurity threats via email.

BACKGROUND

Increasingly, organizations and individuals face various cybersecurity threats through electronic communications. While various solutions have been developed in an attempt to train users to recognize and avoid cybersecurity threats, the attacks may still be effective in some instances. Cyber attackers are continually developing new tactics and methods to deceive users into providing sensitive information via email and other communication methods while avoiding automated solutions for combatting cybersecurity threats. At the same time, the volume of malicious emails and other communications continually increases. Thus, there is a continuing and ever-present need to keep up with the cyber attackers using flexible tools that efficiently use resources and that can be adapted over time to new threats and scaled up as necessary.

SUMMARY

Aspects of the disclosure provide technical solutions that overcome one or more of the technical problems described above and/or other technical challenges. For instance, one or more aspects of the disclosure relate to providing a flexible and automated system for automatically detecting when emails include potentially malicious or otherwise suspicious content, flagging the emails in a way that allows users to interactively and accurately provide various reports indicating the email is or may be malicious, and providing follow-up enforcement actions to protect users from malicious emails. Further aspects provide flexible tools for analyzing malicious emails in order to provide an initial screening of emails received by a user, and then, based on detailed user reporting, provide additional follow-up analysis that may be more computationally intensive before implementing enforcement actions. Aspects of the disclosure provide a solution that may be used in many different contexts because it is not specific to a particular email service provider or client, but instead may be used with any type of email service provider and/or client. The user reporting may also be used to improve email screening and analysis tools over time, thus creating a system that may become more accurate and/or efficient over time, as well as that may keep up with the ever-changing strategies of phishers, spammers, and other malicious actors.

In accordance with one or more embodiments, a computing platform having at least one processor, a communication interface, and memory may intercept email in transit to an email server, analyze the email, and, based on the analyzing, generate at least one unique link for reporting suspicious content associated with the email and generate an email warning tag (EWT) comprising text information and the at least one unique link for reporting the suspicious content associated with the email. The computing platform may then inject the email warning tag into the email to produce a modified email comprising content from the email and the email warning tag, and send the modified email comprising the content from the email and the email warning tag to the email server. As illustrated in greater detail below, the at least one unique link for reporting the suspicious content associated with the email may, in some instances, enable a recipient user to report suspicious email.

Additionally or alternatively, where the at least one unique link comprises a first unique link, the computing platform may further receive, from a user device associated with an email address specified by the email, a selection of the first unique link in the email warning tag, and based on the selection, flag the email as a malicious email. Then, the computing platform may, based on flagging the email as a malicious email, remove the email from an inbox associated with the email address. Additionally or alternatively, based on flagging the email as a malicious email, the computing platform may remove other emails sent by a sender of the email from the inbox. Additionally or alternatively, based on flagging the email as a malicious email, the computing platform may remove other emails sent by a sender of the email from inboxes associated with other email addresses.

In some cases, the email warning tag may be formatted according to a markup language, and the at least one unique link may be associated with at least one button tag defined by the markup language. Additionally or alternatively, the email warning tag may be injected into a beginning of a body of the email.

According to some aspects, the analyzing of the email may further comprise using a machine learning model to generate a suspicious email score based on features derived from the email, wherein the machine learning model is trained using a labeled training data set correlating features of training emails with labels indicating a suspicious email score of each training email.

In some cases, generating the at least one unique link for reporting suspicious content associated with the email comprises generating values indicating one or more of a unique identifier of the email, an identifier of a recipient address, an identifier of an analysis server, or an identifier of a reporting action. In some instances, the unique identifier of the email may be associated with simulated phishing content in the email and/or training content in the email.

The at least one unique link may comprise a plurality of links including one or more of a first link for reporting a spam email, a second link for reporting a phishing email, a third link for reporting a suspicious attachment, or a fourth link for adding a sender of the email to a blocklist. Additionally or alternatively, where the at least one unique link comprises a first link, the computing platform may receive, from a user device, a selection of the first link in the email warning tag, and generate a webpage in response to the selection of the first link, wherein the webpage comprises one or more of a second link for reporting a spam email, a third link for reporting a phishing email, a fourth link for reporting a suspicious attachment, a fifth link for adding a sender of the email to a safelist, a sixth link for adding a sender of the email to a blocklist, or a text box for providing more information about why the user reported the email. Then, the computing platform may send the webpage to the user device.

In some cases, where the at least one unique link comprises a first link, the computing platform may receive a user selection of the first link, generate labeled training data based on the user selection of the first link, and re-train a machine learning model based on the labeled training data.

In some cases, where the at least one unique link comprises a first link that comprises an encrypted email identifier, the computing platform may receive, from a user device, a selection of the first link, decrypt the encrypted email identifier in the first link, and request, from the email server, using the email identifier, the email. Then, the computing platform may receive the email, analyze the email, and perform one or more enforcement actions based on the analyzing. Additionally or alternatively, the computing platform may identify, based on information in the first link, a particular organization associated with the email, and retrieve an email policy associated with the organization, wherein the analyzing of the email is based on the email policy associated with the organization.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
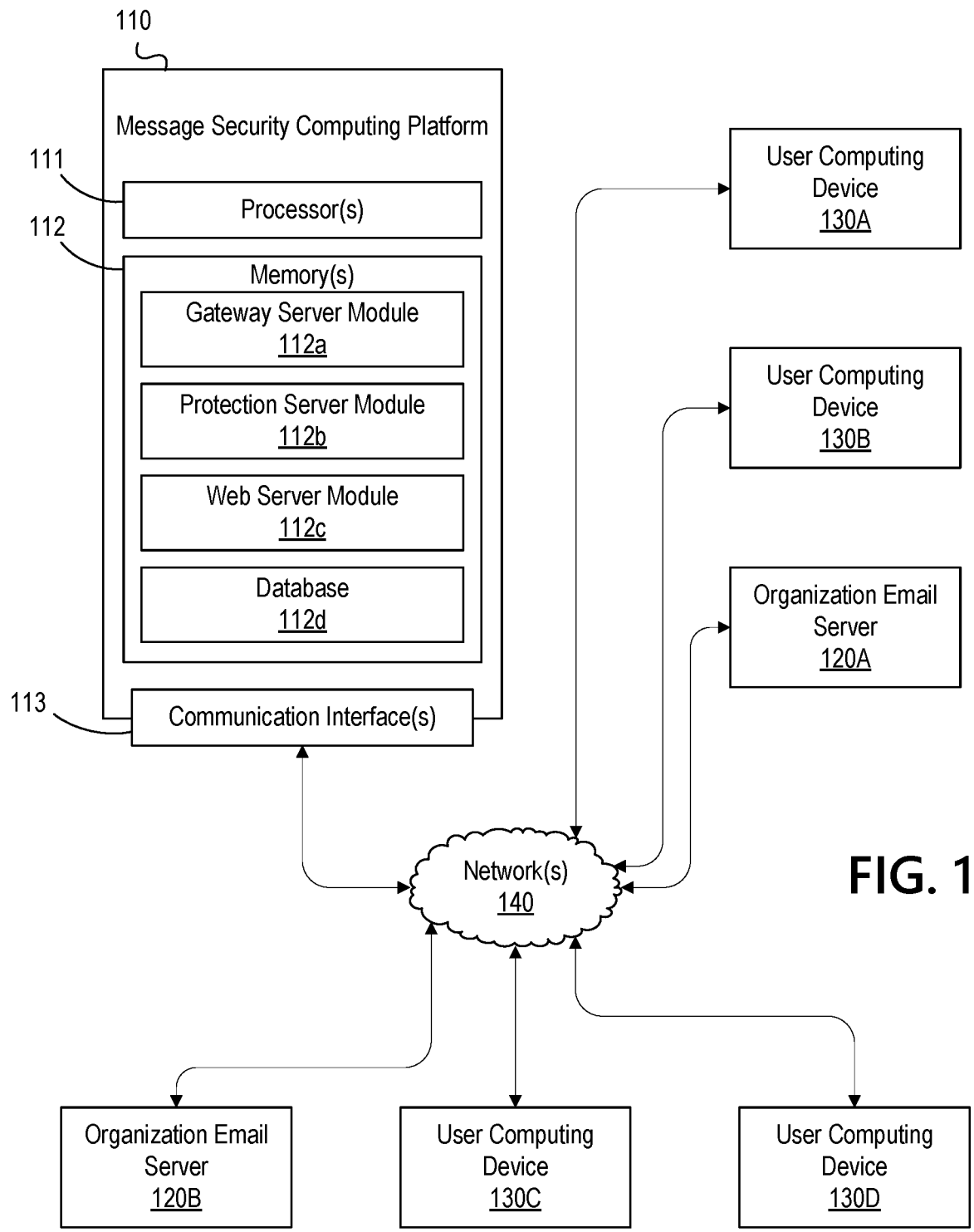
FIG. 1 depicts an illustrative operating environment for providing interactive email warning tags and receiving interactive user email reports in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to improving cybersecurity in electronic communications, such as email. More specifically, and as discussed in further detail below, aspects described herein may provide solutions to problems that arise with current email warning systems. For example, current email warning systems do not detect various reasons why an email is potentially suspicious and/or malicious, and therefore do not provide actionable and specific information that may be used to assist users in appropriately responding to suspicious and/or malicious emails. Additionally, current email warning systems do not provide easy and flexible solutions for users to accurately report suspicious and/or malicious emails so that the appropriate enforcement actions may be taken against the suspicious and/or malicious emails. Additionally, current email warning systems do not provide flexible reporting tools that may be used with various email service providers and clients.

One or more aspects of the disclosure thus provide technical solutions to various technical problems associated with enterprise security in the context of electronic communications such as email. For example, aspects described herein provide for an initial analysis of some or all incoming emails in order to determine various reasons why a particular email should be flagged as suspicious and/or malicious. By performing this initial analysis, more information about potentially harmful emails may be provided to users even before the potentially harmful email is flagged by a system that may perform enforcement actions, which may assist users in recognizing the potentially harmful email and avoiding potential security breaches. Furthermore, because aspects described herein provide detailed information on the reasons why a particular email was flagged as suspicious or potentially malicious, users may be better alerted to the specific threats posed by the potentially harmful email, and thus may be less susceptible to falling victim to attempted security breaches.

Furthermore, aspects described herein provide for interactive reporting mechanisms that allow users to indicate specific reasons why a particular message was correctly or incorrectly labeled as suspicious as well as indicate which particular enforcement actions should be taken. By leveraging the detailed reporting the users may provide, aspects described herein may supplement initial determinations intelligently to provide a more robust and dynamic system that may more accurately flag and respond to suspicious or harmful emails. Moreover, by using reporter scores to determine whether a user's report is more or less likely to be accurate based on past reporting performance, and by re-training and/or otherwise updating models over time as additional data is generated, aspects described herein may provide for dynamic analysis and flagging that may improve over time in response to the constantly changing techniques employed by malicious actors.

Additionally, aspects described herein provide analysis, alerting, and reporting tools that may be used by a wide variety of email services because the tools do not depend on the particular features provided by any given email service and/or client. Thus, instead of providing tools that work only with a single email provider and/or client, the techniques described herein work with almost any email client or server, thus providing a more flexible tool that works across email providers. These aspects provide a significant benefit because, for example, training data sets may be larger when they may be created from data obtained from multiple service providers, and thus analysis and flagging tools trained based on the data sets may be more accurate.

FIG. 1 depicts an illustrative operating environment for providing interactive email warning tags and receiving interactive user email reports in accordance with one or more example embodiments. Referring to FIG. 1, computing environment 100 may include various computer systems, computing devices, networks, and/or other operating infrastructure. For example, computing environment 100 may include a message security computing platform 110, a plurality of organization email servers (e.g., 120A, 120B), a plurality of user computing devices (e.g., 130A-D), and one or more network(s) 140.

Network(s) 140 may include one or more wired networks and/or one or more wireless networks that interconnect the message security computing platform 110, plurality of organization email servers (e.g., 120A, 120B), plurality of user computing devices (e.g., 130A-D), and/or other computer systems and/or devices. In addition, each of the message security computing platform 110, plurality of organization email servers (e.g., 120A, 120B), and/or plurality of user computing devices (e.g., 130A-D) may be special purpose computing devices configured to perform specific functions, as illustrated in greater detail below, and may include specific computing components such as processors, memories, communication interfaces, and/or the like.

The message security computing platform 110 may include one or more processor(s) 111, one or more memory(s) 112, and one or more communication interface(s) 113. In some instances, message security computing platform 110 may be made up of a plurality of different computing devices, which may be distributed within a single data center or a plurality of different data centers. In these instances, the one or more processor(s) 111, one or more memory(s) 112, and one or more communication interface(s) 113 included in message security computing platform 110 may be part of and/or otherwise associated with the different computing devices that form message security computing platform 110.

In one or more arrangements, processor(s) 111 may control operations of message security computing platform 110. Memory(s) 112 may store instructions that, when executed by processor(s) 111, cause message security computing platform 110 to perform one or more functions, as discussed below. Communication interface(s) 113 may include one or more wired and/or wireless network interfaces, and communication interface(s) 113 may connect message security computing platform 110 to one or more networks (e.g., network(s) 140) and/or enable message security computing platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause message security computing platform 110 to perform various functions) and/or databases (which may, e.g., store data used by message security computing platform 110 in performing various functions). For example, memory(s) 112 may store and/or otherwise provide a gateway server module 112a, a protection server module 112b, a web server module 112c, and database 112d. In some instances, the gateway server module 112a may store instructions that cause the message security computing platform 110 to intercept emails being set to one of the organization email servers 120 and/or to analyze the intercepted email, embed an interactive email warning tag, and forward the email to the organization email server 120 as described herein. The protection server module 112b may store instructions that cause the message security computing platform 110 to detect suspicious emails and embed one or more interactive email warning tags in the emails, as well as to analyze reported emails in order to implement enforcement actions such as quarantining of emails, deletion of emails, or the like. The protection server module 112b may use one or more models trained to detect suspicious emails, detect spam emails, detect phishing emails, and the like. The web server module 112c may store instructions that cause the message security computing platform 110 to serve interactive web pages and to receive user reports when users select web links that are provided in interactive email warning tags. Furthermore, the database 112d may store data that may be used by message security computing platform 110 for training any models, for storing organization-specific policies, for storing user reporting data, and/or in executing one or more other functions described herein.

The plurality of organization email servers 120 may be associated with one or more respective organizations. For example, a first organization email server 120A may be associated with a first organization, and a second organization email server 120B may be associated with a second organization. Additionally or alternatively, multiple organization email servers may be used by a single organization. The organizations may be enterprise organizations or any other type of organization. Each organization email server 120 may be used to host an email service for one or more members of the organization, including maintaining email inboxes, delivering incoming emails, sending outgoing emails, and the like. Any number of organizations may communicate with the message security computing platform 110 using an organization email server 120 to host an email service for the respective organization.

Each organization email server 120 may also use different technologies to provide an email service to a respective organization and its users. For example, a first organization email server 120A may use a first email service (e.g., a MICROSOFT OUTLOOK email service), a second organization email server 120B may use a second email service (e.g., an APPLE email service), and/or the like. In general, although only two organization email servers 120 are illustrated, any number of organization email server 120 may be used with the message security computing platform 110, and each organization email server 120 may provide one of many different email services.

The user computing device(s) 130 may be used by respective users (e.g., employees, members, or customers of an organization). For example, user computing device(s) 130A and 130B may be associated with different users of a first organization, and user computing device(s) 130C and 130D may be associated with different users of a second organization. The enterprise user computing device 130 may be user-owned devices, employer-provided devices, or other types of devices used by respective users. The users of the user computing devices 130 may use the user computing devices 130 to interact with email services provided by the organization email servers 120.

Organizations may have different numbers of users and different structures. Thus, although the examples below describe providing interactive email warning tags and receiving interactive user reports in the context of a few example devices, it should be understood that these descriptions are intended to show example operations that may be used in real-world contexts involving potentially large numbers of users, with various email services that may be customized for various organizations, and other variations.

Figure 2A:
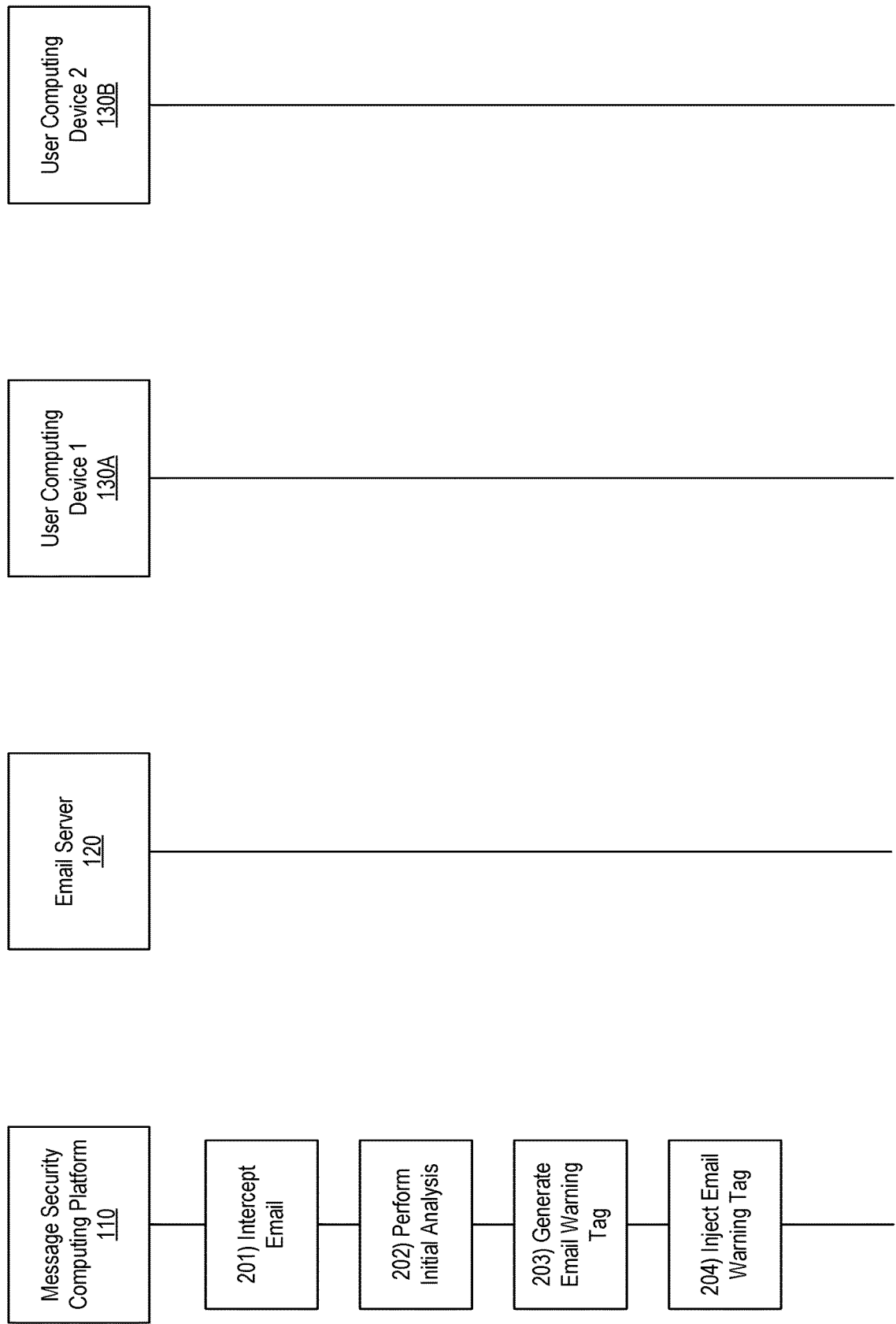
FIGS. 2A-2C depict an illustrative event sequence for providing interactive email warning tags and receiving interactive user email reports in accordance with one or more example embodiments.
Figure 2B:
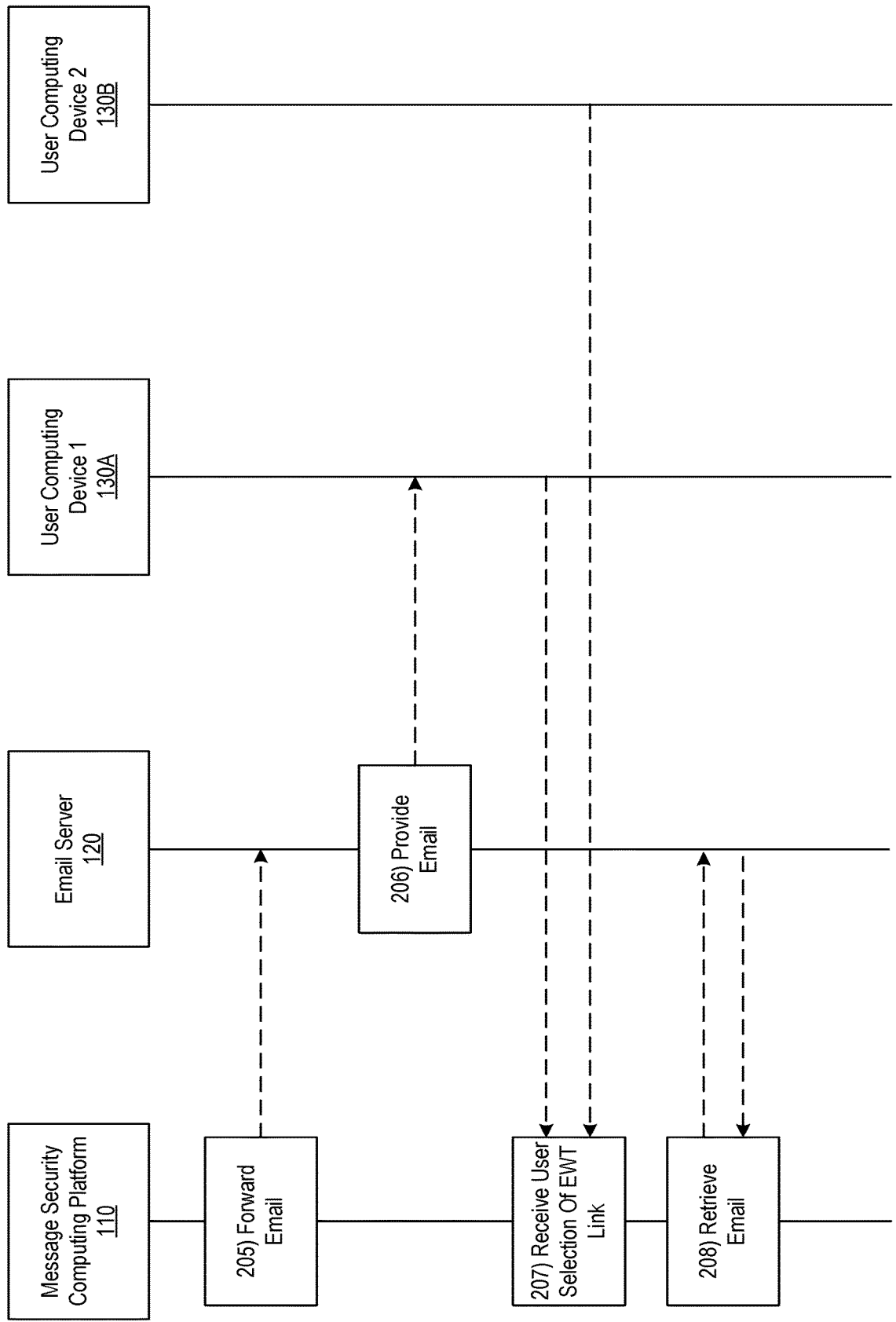
Figure 2C:
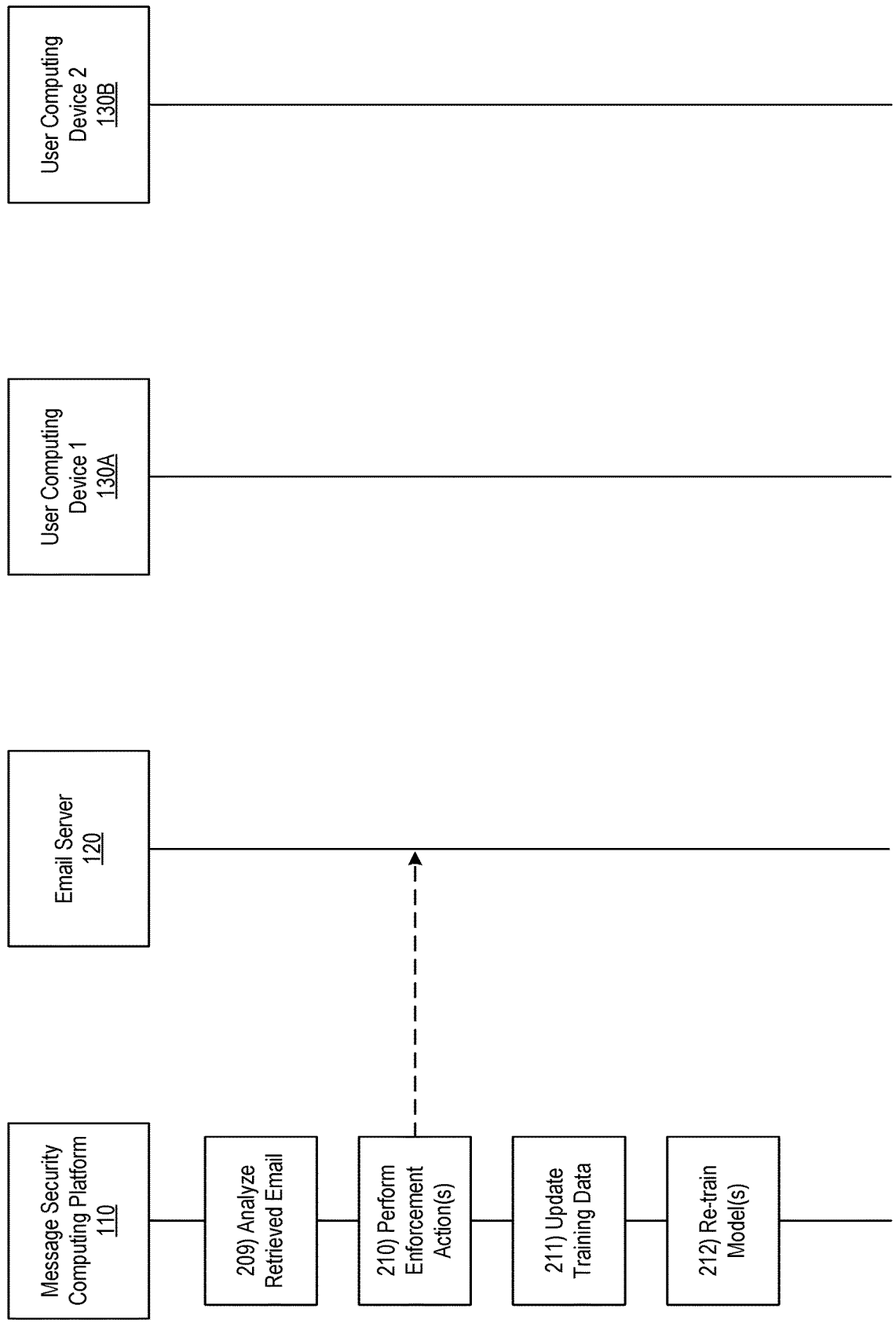

FIGS. 2A-2C depict an illustrative event sequence for providing interactive email warning tags and receiving interactive user email reports in accordance with one or more arrangements described herein. Referring to FIG. 2A, at step 201 the gateway server module 112a of the message security computing platform 110 may intercept or otherwise receive an email being sent to an organization email server 120. For example, the email may be an external email being routed to the organization email server 120 (e.g., an email being routed by an external email sender on behalf of an external sender to a user computing device 130A associated with the organization email server 120A) and/or may be an internal email sent from one user computing device 130 associated with an organization to another (e.g., an email from user computing device 130A to user computing device 130B). In some cases, the organization email server 120 may host or otherwise provide an email inbox to user devices 130 associated with an organization, and thus emails addressed to a particular user may arrive at the user's inbox hosted at the organization email server 120. The message security computing platform 110 may perform the process of FIGS. 2A-2C, as described in detail below, before forwarding the email to the organization email server 120, where it may be provided to a user via the user's inbox.

At step 202, the protection server module 112*b* of the message security computing platform 110 may perform an initial analysis of the email to detect whether to apply an interactive email warning tag. Various interactive email warning tags may be applied to emails that the message security computing platform 110 may analyze and flag as suspicious. The email warning tags may include text indicating why the email is suspicious and one or more interactive links so that a user who receives the email may report or otherwise flag the email for further analysis and/or other protective actions.

In order to detect whether to apply an interactive email warning tag, the protection server module 112*b* of the message security computing platform 110 may perform various analyses of the email. For example, according to a first analysis, the protection server module 112*b* of the message security computing platform 110 may detect whether the email is from an external sender (e.g., whether the sender address uses a domain that is not associated with the organization of the recipient and/or whether the email came in from an external email server not associated with the same organization as the intended recipient of the email). Accordingly, the message security computing platform 110 may compare a domain name of the sender address to one or more domain names associated with the organization of the recipient to determine whether there is a match or not. Additionally or alternatively, the message security computing platform 110 may determine that the email was received from an email server associated with a different organization using a list of email servers (e.g., with associated IP addresses or other information for each server) that are associated with the recipient. If the sender is an external sender, the message security computing platform 110 may flag the email so that a first type of interactive email warning tag may be applied as described below.

Additionally or alternatively, the protection server module 112*b* of the message security computing platform 110 may perform a second analysis to detect whether the email is from a new sender outside the recipient's circle of trust. The circle of trust may be and/or include a set of entities that the recipient typically and/or normally interacts with, and the circle of trust may be determined by the message security computing platform 110 and/or by one or more other servers and/or devices connected to the message security computing platform 110. The message security computing platform 110 may thus maintain (e.g., in database 112*d*) a list or other data structure for each recipient of an organization that specifies which email addresses are within that user's circle of trust. The message security computing platform 110 may be configured to retrieve this data upon request from the organization email server 120, and may update the data at regular intervals. For example, the message security computing platform 110 may, at intervals, request a list of email addresses from the organization email server 120 indicating which email accounts the user has previously corresponded with, and may add the indicated email accounts into the data structure indicating the user's circle of trust. If the sender address of the intercepted email is not within a recipient's circle of trust, the message security computing platform 110 may flag the email so that a second type of interactive email warning tag may be applied as described below.

Additionally or alternatively, the protection server module 112*b* of the message security computing platform 110 may perform a third analysis to calculate an impostor score indicating whether a sender is falsely impersonating a different sender (e.g., an external sender impersonating an internal sender). The protection server module 112*b* may analyze several aspects of the server to calculate an impostor score, such as information about a computing device that delivered the email, text of the email, email attachments, the recipient of the email, etc. In some cases, the message security computing platform 110 may store a trained model (e.g., a neural network) that may be used to generate the impostor score based on inputs derived from the email.

The message security computing platform 110 may store a model (e.g., a neural network) that was trained by another device and/or trained by the message security computing platform 110 (e.g., the model may be trained prior to the execution of the process of FIGS. 2A-2C, in parallel with the execution of the process of FIGS. 2A-2C, etc.). The message security computing platform 110 may train the model using a training data set that correlates one or more inputs derived from a particular email with a label indicating whether each email is an impostor email or not. The message security computing platform 110 may use machine learning techniques, statistical techniques, or other similar techniques to learn to predict whether new emails are impostor emails or not. In some cases, the message security computing platform 110 may store a trained model (e.g., a neural network) that may be used to generate the impostor score based on inputs derived from the email received at step 201.

For example, the training data used to train a model (e.g., a neural network) may include inputs indicating, for each email of a plurality of training emails, a sending address, one or more words appearing in the email, the entire text of the email, a presence or absence of email attachments, a type of email attachment, a recipient of the email, and other such data inputs that may be generated based on the corresponding email and may tend to indicate whether an email is an impostor email, whether an email is spam, whether an email includes a phishing attempt, and/or other indications of whether an email is suspicious. This training data may be correlated to labeled outputs indicating, for each email, whether the email was an impostor email, whether the email was spam, whether the email included a phishing attempt, and/or other such flags indicating that the email was suspicious. The message security computing platform 110 may use one or more machine learning techniques, such as supervised learning techniques, to train a machine learning model (e.g., a neural network) to provide an output indicating whether an email is an impostor email or not, whether an email is spam, whether an email includes a phishing attempt, and/or other such indications of whether an email is suspicious based on the inputs. The message security computing platform 110 may train the neural network or other model using techniques such as gradient descent to iteratively adjust the weights of the neural network until the neural network reaches a certain level of accuracy in predicting whether an email should be flagged or not using the training data set.

The protection server module 112*b* of the message security computing platform 110 may use this stored model (e.g., a trained neural network) to generate an impostor score for the email that was intercepted at step 201. The message security computing platform 110 may generate inputs based on the email and provided the inputs to the trained model to generate an output, which may indicate an impostor score. The impostor score may be a binary score indicating whether the email is from an impostor or not, and/or may indicate a probability or likelihood that an email is an impostor email. Then, if the impostor score satisfies some criterion (e.g., the impostor score is higher than a predefined threshold), the message security computing platform 110 may flag the email so that a third type of interactive email warning tag may be applied as described below.

Additionally or alternatively, the protection server module 112b of the message security computing platform 110 may perform a fourth analysis to detect whether any uniform resource locators (URLs) embedded within the email link to any malicious websites. The message security computing platform 110 may, for example, evaluate whether the URL contains characters from multiple scripts, such as Cyrillic and Latin, which may indicate an attempt to direct a user to fake domain. For example, although a Cyrillic "a" and a Latin "a" may appear identical to a user, these characters are two different Unicode characters, which may be interpreted differently by some browsers. Thus, malicious entities may set up fake or malicious websites with domain names that may appear (at least to a user) similar or identical to a legitimate domain name. The message security computing platform 110 may analyze whether URLs contain multiple scripts, and if so, may flag the email as potentially containing a malicious link. Additionally or alternatively, the message security computing platform 110 may compare the domain name or other information embedded within the URL to a database of malicious URL information and/or a database of known safe URL information in order to determine whether any link(s) in the email are malicious or potentially malicious. Additionally or alternatively, the message security computing platform 110 may access the link(s) to obtain content available at the location of the link, and analyze the content to determine whether it is malicious, as described in detail below for step 208. If the message security computing platform 110 determines that any URL within the email is suspicious, it may flag the email so that a fourth type of interactive email warning tag may be applied as described below.

Additionally or alternatively, the protection server module 112b of the message security computing platform 110 may perform a fifth analysis of the email using the DMARC (Domain-based Message Authentication, Reporting and Conformance) protocol. The DMARC protocol allows a recipient of an email to authenticate the email using standardized mechanisms in order to determine whether the email is spoofed. The message security computing platform 110 may perform authentication according to DMARC in order to determine whether an email is suspicious, and based on the DMARC authentication, the message security computing platform 110 may flag the email so that a fifth type of interactive email warning tag may be applied as described below.

Additionally or alternatively, the protection server module 112b of the message security computing platform 110 may perform a sixth analysis of the age of the sender's domain. The message security computing platform 110 may thus check information provided by a domain registrar or some other source of information about the domain name of the sender. If the domain name is too new (e.g., less than a certain number of days have passed since the domain was registered), then the message security computing platform 110 may flag the email so that a sixth type of interactive email warning tag may be applied as described below.

At step 203, the protection server module 112b of the message security computing platform 110 may generate an interactive email warning tag based on the analysis at step 202. The generated email warning tag may include information about one or more reasons that the email is suspicious, as determined at step 202, and one or more unique links that allow a recipient of the email to report the email. For example, each of multiple unique links may correspond to one of multiple reasons that the email is suspicious.

The one or more unique links may be encrypted links, and may contain information that may be used (e.g., as described below) if the link is later selected. For example, a user may select one unique link in order to report that an email is spam, may select another unique link to report when an email is from an impostor, etc. The link may thus contain information that may be used to identify a type of report and/or intended action, identify the email in question, identify a recipient of the email, identify a device and/or service that may analyze the message, and other such information. Thus, in order to generate the unique links, the message security computing platform 110 may generate an identifier (e.g., a globally unique identifier or GUID) identifying the email, may generate an identifier corresponding to a recipient address, and may select an identifier for a device and/or service that may be used to analyze the email. Each of these identifiers and/or other information may be embedded in the unique link (e.g., before it is encrypted). For example, a link may be constructed according to an example pattern such as www.example.com/?report_type=W&message_id=X&recipient_id=Y&analysis_server_id=Z. In this example, the domain name (here, "example.com") may direct to the web server module 112c implemented by the message security computing platform 110 and/or may direct to some other web server that may be used for reporting and analysis of a link selected by a user. Further, the "W" value for "report_type" may indicate a type of report indicated by the link (e.g., a report that the email is spam, a report that the email is from an impostor, etc.). Further, the "X" value for "message_id" may be a GUID for uniquely identifying the email corresponding to the EWT. Further, the "Y" value for "recipient_id" may identify the recipient address. In some cases, the value of the recipient address identifier may be a (potentially modified and/or reformatted) email address (e.g., a value such as "username@domain.com"). Further the "Z" value for "analysis_server_id" may indicate an identifier of a server and/or module that should be used to analyze the email when a user selects the link (e.g., it may point to a server hosting an instance of an analysis service).

The message security computing platform 110 may thus generate an email warning tag with various information and links. For example, the email warning tag may, responsive to the first analysis of step 202, contain information indicating "This message is from an external sender" or similar such information, and one or more links for performing relevant actions that correspond to the first analysis. For example, one unique link may allow a recipient of the email to add the external sender to a safelist (e.g., in order to prevent blocking future emails from the sender), another unique link may allow a recipient of the email to add the external sender to a blocklist (e.g., in order to block delivery of future emails from the external sender), another unique link may allow a recipient of the email to report the email as spam, and the like.

Additionally or alternatively, the email warning tag may, responsive to the second analysis of step 202, contain information indicating "This message is from an untrusted sender" or similar such information, and one or more links for performing relevant actions that correspond to the second analysis. For example, as above, one unique link may allow a recipient of the email to add the untrusted sender to a safelist and/or some other list indicating a circle of trust (e.g., in order to remove warning tags for future emails and/or prevent blocking of future emails), another unique link may allow a recipient of the email to add the untrusted sender to a blocklist (e.g., in order to block delivery of future emails from the untrusted sender), another unique link may allow a recipient of the email to report the email as spam, and the like.

Additionally or alternatively, the email warning tag may, responsive to the third analysis of step 202, contain information indicating "This sender may be an impostor" or similar such information, and one or more links for performing relevant actions that correspond to the third analysis. For example, one unique link may allow a recipient of the email to report the sender as an impostor and/or block future emails from the sender, another unique link may allow a recipient of the email to add the untrusted sender to a safelist or otherwise indicate that the sender is not an impostor (e.g., in order to remove warning tags for future emails and/or prevent blocking of future emails), another unique link may allow a recipient of the email to report the email as spam, and the like.

Additionally or alternatively, the email warning tag may, responsive to the fourth analysis of step 202, contain information indicating "This email may contain a link to a malicious URL" or similar such information, and one or more links for performing relevant actions that correspond to the fourth analysis. For example, one unique link may allow a recipient of the email to report a linked website as malicious. For an email containing multiple suspicious URLs, a unique link may be generated for each of the multiple suspicious URLs, so that a user may select a first unique link to report a first suspicious URL, select a second unique link to report a second suspicious URL, and the like. Additionally or alternatively, the email warning tag may contain one or more unique links for adding a sender of the email to a safelist, adding a sender to a blocklist, reporting the email as spam, and the like.

Additionally or alternatively, the email warning tag may, responsive to the fifth analysis of step 202, contain information indicating "The sender's identity could not be verified" or similar such information, and one or more links for performing relevant actions that correspond to the fifth analysis. For example, one unique link may allow a recipient of the email to report the sender as an impostor and/or block future emails from the sender, another unique link may allow a recipient of the email to add the untrusted sender to a safelist or otherwise indicate that the sender is not an impostor (e.g., in order to remove warning tags for future emails and/or prevent blocking of future emails), another unique link may allow a recipient of the email to report the email as spam, and the like.

Additionally or alternatively, the email warning tag may, responsive to the sixth analysis of step 202, contain information indicating "The sender's domain is new and could be unsafe" or similar such information, and one or more links for performing relevant actions that correspond to the fourth analysis. For example, one unique link may allow a recipient of the email to add the sender and/or domain to a safelist (e.g., in order to prevent blocking future emails from the sender and/or domain), another unique link may allow a recipient of the email to add the sender and/or domain to a blocklist (e.g., in order to block delivery of future emails from the sender and/or domain), another unique link may allow a recipient of the email to report the email as spam, and the like.

Figure 3A:
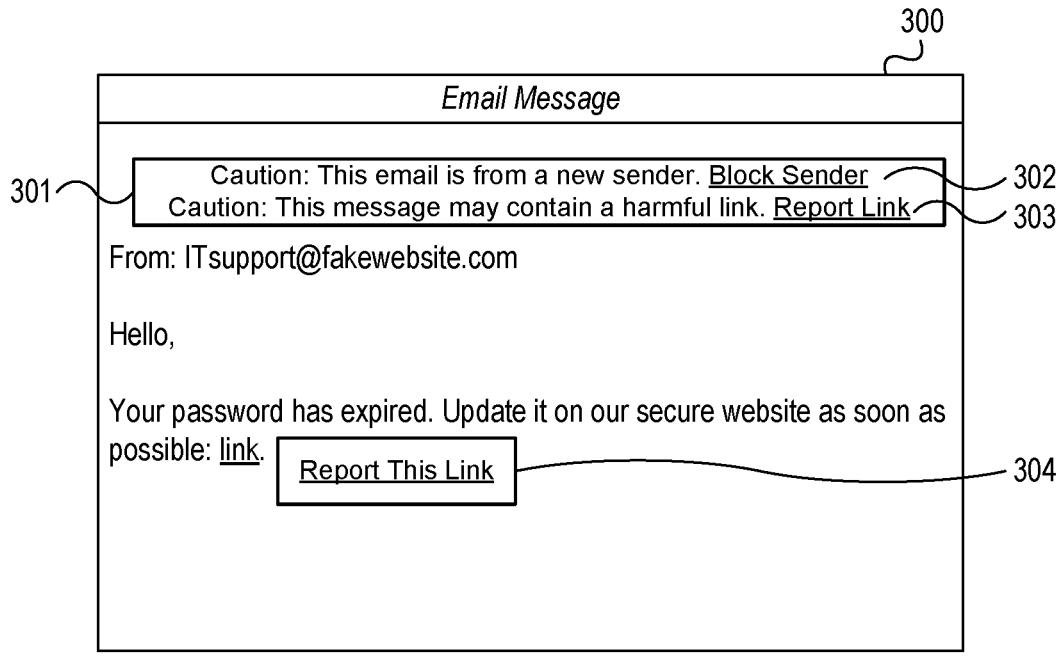
FIGS. 3A, 3B, 4A and 4B depict illustrative user interfaces for providing interactive email warning tags and receiving interactive user email reports in accordance with one or more example embodiments.

At step 204, the gateway server module 112*a* of the message security computing platform 110 may inject the email warning tag generated at step 203 into the email received at step 201. For example, as shown in FIG. 3A, the message security computing platform 110 may create a banner 301 appearing at the top of an email and add the information and unique links of the email warning tag into the banner 301. Then, when a client displays the email message (e.g., as shown in example user interface 300 of FIG. 3A), the email message may be displayed with a banner 301 including the email warning tag. The email warning tag, as discussed above, may include information providing one or more warnings (e.g., as determined by the various analyses of step 202) as well as one or more unique links for reporting content or taking enforcement actions. For example, as shown in FIG. 3A, a first unique link 302 may allow a user to block a particular suspicious sender, a second unique link 303 may allow a user to report one or more suspicious links, etc. Although FIG. 3A only shows two links provided in an email warning tag within a banner 301, in general any of the unique links described above and/or other unique links may be provided in order to allow a user to report various suspicious aspects of the email, perform various enforcement actions, and the like.

Additionally or alternatively, content of an email warning tag may be injected into other portions of the email. For example, if the message security computing platform 110 generated unique links for reporting one or more suspicious URLs, then the unique links could be embedded before, after, or otherwise nearby a corresponding suspicious link, as further shown in example FIG. 3A. For example, a unique link 304 for reporting a suspicious link may be embedded directly after the corresponding suspicious link. This method may be particularly advantageous when multiple suspicious links are embedded in a particular email. Thus, in one example, the message security computing platform 110 may determine that corresponding reporting buttons with associated unique reporting links should be embedded next to suspicious links only if an email contains multiple suspicious links.

The various unique links may be formatted according to the example described above (e.g., a unique link specifying message_id, recipient_id, analysis_server_id, and/or report_id values). In some cases, the various links for a particular email warning tag may all share a message_id, recipient_id, and/or analysis_server_id value, but the report_id value may vary among the links so that, by selecting a particular link, a user may indicate a desired type of report (e.g., blocking a sender or reporting a link according to the example shown in FIG. 3A).

In order to inject the email warning tag into the email, the message security computing platform 110 may first format the email warning tag. For example, the message security computing platform 110 may generate one or more HTML (or other markup language) tags, insert the information and/or unique links as data values for the HTML tags, and embed the HTML email warning tag into the email. In some cases, formatting may be applied to the interactive email warning tag that causes the email warning tag to stand out from the rest of the email. For example, if an email uses certain color text, then the email warning tag may be formatted with a different color text in order to make it stand out. Similarly, when the unique links are embedded next to suspicious URLs within the email, then the message security computing platform 110 may format the unique links so that they stand out from the rest of the email (e.g., by putting them within a "button" HTML tag, giving them a border, using a background color for the unique link that is different from the background color of the email, changing the font color of the unique link, and/or performing other such formatting and/or tagging actions). As a specific example, the banner 301 of FIG. 3A may be placed into an HTML "<div>" tag and styled using various formatting properties (e.g., using HTML and/or CSS), the link 304 may be placed within a "<button>" tag, and like.

Figure 3B:
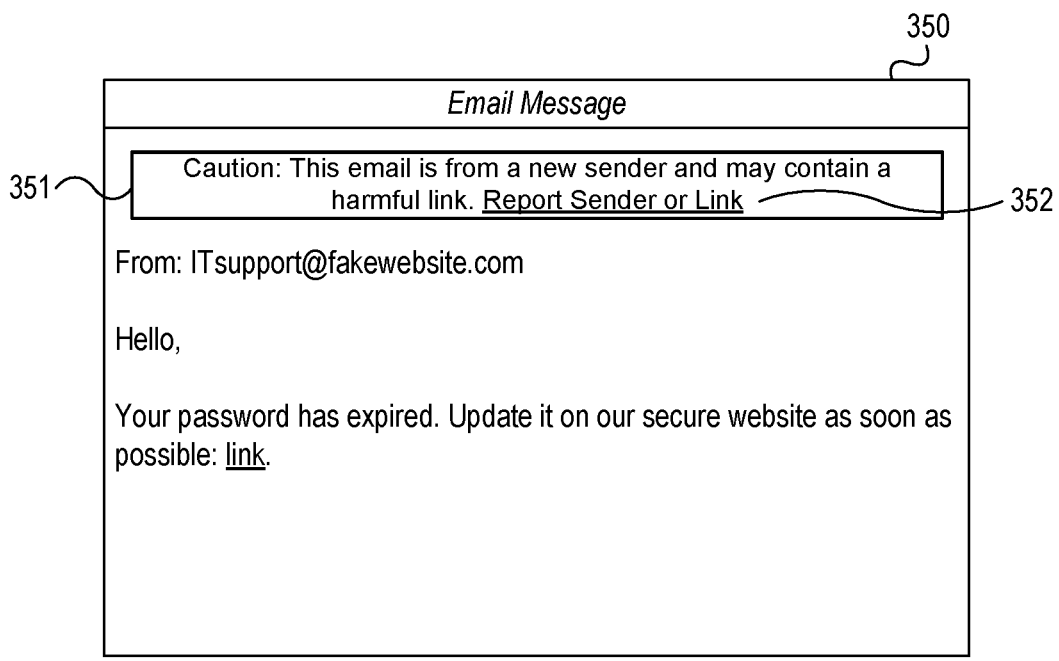

As an alternative to an email warning tag containing multiple links, in some embodiments an email warning tag may contain only a single link, as shown in FIG. 3B. Thus, when an email message is displayed via a user interface 350, the generated banner 351 containing the injected email warning tag may include only a single unique link 352.

With reference to FIG. 2B, at step 205, the gateway server module 112a of the message security computing platform 110 may forward the modified email with the injected email warning tag to an email server 120 associated with the intended recipient of the email. The email server 120 may host an inbox for the intended recipient, and thus may notify a user computing device 130 associated with the intended recipient that an email has been received in order to deliver the email to the recipient.

At step 206, after the email has been received at the email server 120, a user may retrieve the email from the email server 120. In some cases, the email server 120 may host a web-based email service, and the user computing device 130 may access the web-based email service to retrieve the email. Additionally or alternatively, a software application running on the user computing device 130 (e.g., an email application) may request and/or receive emails from the email server 120 and may cause display of the emails at the user computing device 130.

At step 207, the web server module 112c of the message security computing platform 110 may receive a user selection of one of the unique links of the email warning tag from a user device 130. As illustrated in the figure, a selection of one of the links may come from a user device 130 that is associated with a recipient of the email and/or another user device 130. For example, a user may forward a particular email to another user, who may in turn decide to select a reporting link. A user may decide to select one of the unique links for any reason; for example, a user may judge that an email is spam and then may decide to select a unique link for reporting the email as spam. The message security computing platform 110 may decrypt the link if it is encrypted in order to obtain the unique link including data values indicating one or more of a report_type, a message identifier, a recipient identifier, and/or an analysis server identifier, as discussed above in connection with step 203. These values may be used to take the indicated type of action (e.g., corresponding to the report_type) on the indicated email (e.g., as indicated by the message identifier) and/or for the indicated recipient (e.g., as indicated by the recipient identifier) and/or by the indicated analysis server or service (e.g., as indicated by the analysis server identifier), as described in greater detail below.

Figure 4A:
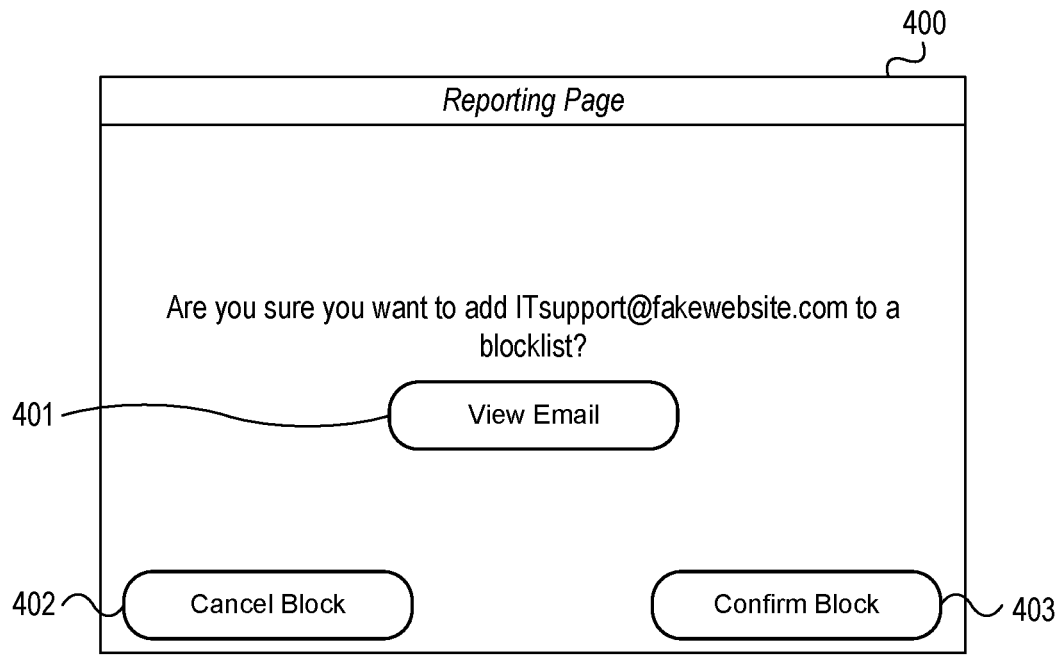

In some cases, the web server module 112c of the message security computing platform 110 may require some type of confirmation before moving forward with additional steps according to the process of FIGS. 2A-2C (i.e., before performing any enforcement actions). For example, in response to receiving a selection of a unique link from the user device 130, the message security computing platform 110 may generate a web page requesting confirmation of the action indicated by the unique link. As a specific example, as shown in FIG. 4A, if the unique link indicated that a particular user (e.g., as indicated by the recipient_id) wishes to add a sender of a particular message (e.g., as indicated by the sender_id) to a blocklist (e.g., the report_id includes a value indicating a blocklist), then the message security computing platform 110 may generate a web page 400 that asks for confirmation that a particular email account should be added to a blocklist, may generate confirmation 403 and cancel 402 links, and may display the web page for the user, as shown in FIG. 4A. Then if the user further selects the confirm link 403, the message security computing platform 110 may proceed with the next step of the process of FIGS. 2A-2C as described below, whereas if the user clicks the cancel link 402, the message security computing platform 110 may avoid taking any further action. As further shown in FIG. 4A, a reporting web page (e.g., web page 400) may optionally include a link for viewing the original email (which, if selected, may cause the message security computing platform 110 to obtain the email as described below for step 208 and display it).

Figure 4B:
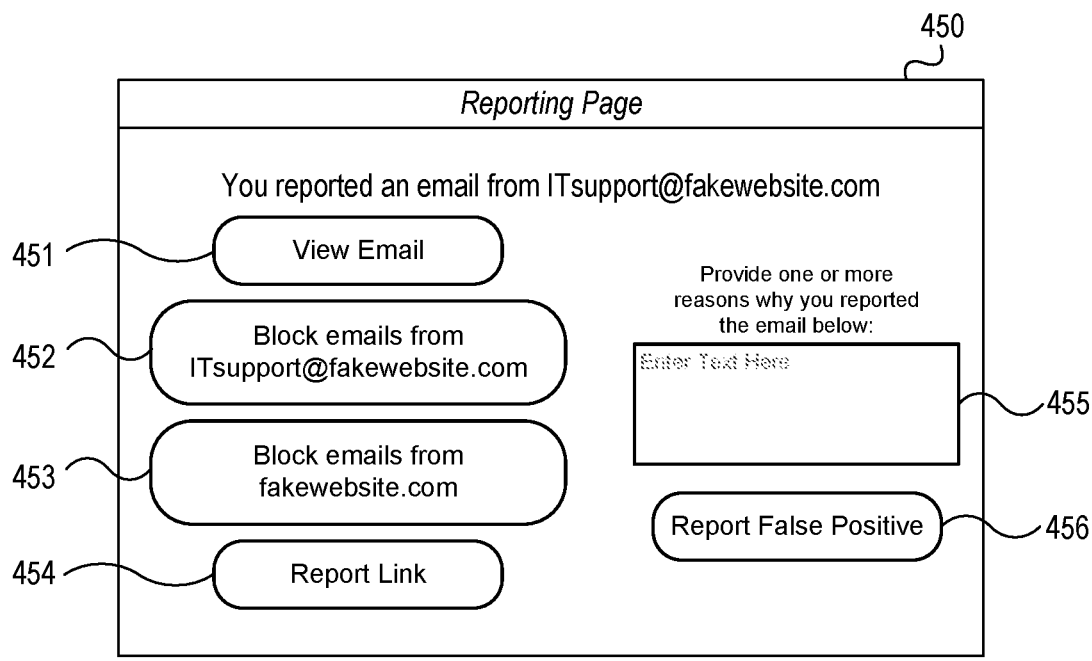

In some cases, the web server module 112c of the message security computing platform 110 may generate a confirmation page including one or more additional options for indicating one or more additional issues with the email. For example, if the user initially selected a link to report that an email was spam, a confirmation page may include additional options such as an option to add the sender to a blocklist. An example confirmation web page 450 providing multiple options is shown as FIG. 4B. The example confirmation page 450 includes a first link 451 for viewing the email that was reported (which may be retrieved as described below for step 208), a second link 452 for blocking emails from the particular sender of the reported email, a third link 453 for blocking emails from the domain of the sender of the reported email, and a fourth link 454 for reporting a link that was embedded in the email. Additionally, the confirmation page 450 may include a text box 455 that allows a user to input textual reasons explaining why the user reported the email. Additionally, the confirmation page 450 may include a fifth link 456 that allows a user to indicate that the email was incorrectly marked as suspicious and/or harmful. Although the example confirmation page 450 thus includes several additional options, in practice more or fewer links and/or options may be displayed on a confirmation page that allow a user to select any of the reporting and/or enforcement actions described herein. A confirmation page including one or more additional options for indicating one or more issues with the email may be particularly advantageous when an email warning tag includes only a single link, instead of multiple links for indicating a specific type of report, as described above in connection with FIG. 3B.

The one or more additional options provided on the confirmation page may allow a user to provide more detailed information about why the email was reported by the user. For example, a confirmation page may include options for indicating that an email was spam, that an email was a phishing attempt, that an email had a suspicious attachment, and/or other similar options. Such indications may be selected via dedicated links and/or by inputting information textually (e.g., into text box 455). Further options may allow a user to indicate that a sender of an email should be added to a safelist or blocklist, that the warning tag was incorrectly classified, and/or the like.

At step 208, the protection server module 112b of the message security computing platform 110 may retrieve an email indicated by the link selected by the user at step 207 for further analysis. For example, the message security computing platform 110 may retrieve a message_id field from the decrypted link and send a request to an email server 120 (e.g., the email server 120 associated with the inbox of the recipient indicated by a recipient identifier associated with the selected link) that provides a message identifier indicating the email. The email server 120 may respond to the message security computing platform 110 with the email indicated by the message identifier.

With reference to FIG. 2C, at step 209, a protection server module 112b of the message security computing platform 110 may further analyze the email retrieved at step 208 to determine whether one or more enforcement actions should be applied. In some cases, the message security computing platform 110 may select a particular protection server module 112b (e.g., if multiple such modules are included as part of message security computing platform 110) in order to perform the analysis based on the analysis_server_id value indicated by the link. For example, different organizations may each be assigned a dedicated protection server module 112b, which may be indicated by the analysis_server_id field. Thus, the analysis_server_id may indicate a particular analysis server and/or protection server module 112b, which may correspond to a particular organization. Each organization may, for example, have different policies (e.g., rules about which email accounts cannot be blocked, rules indicating which users may perform certain enforcement actions, and/or the like), and thus, by selecting the correct protection server module 112b, the message security computing platform 110 may allow the analysis at step 209 to proceed according to a particular organization's policies. Additionally or alternatively, a protection server module 112b may be assigned to multiple organizations, and the protection server module 112b may thus need to determine which organization the report corresponds to, retrieve the appropriate policies for the organization, and the like. The protection server module 112b may determine which organization a report corresponds to based on the recipient_id of the unique link and/or using some other method. For example, the recipient_id may indicate a recipient's email address, which may include a domain name indicating the appropriate organization.

In some cases, the enforcement action that should be performed may be clear based on a user report (e.g., the user requests that a particular suspicious sender be added to a blocklist), in which case further analysis to determine an enforcement action may not be necessary. However, in some cases, whether to apply an enforcement action based on a user report may require further analysis (e.g., when the user reports a suspicious attachment). Additionally or alternatively, the message security computing platform 110 may verify whether a user report is correct (e.g., to confirm that the message was not falsely identified as malicious), authorized by organization policies, and/or the like. Thus, at step 209, the protection server module 112b of the message security computing platform 110 may perform one or more analyses in order to determine whether a particular email is malicious and/or to whether perform one or more enforcement actions. In comparison to the analyses of step 202, which might be performed on most or all incoming emails, the analyses of step 209 may be performed on the subset of emails that are flagged by users, and therefore may be more computationally intensive. Additionally, more data may have been received by step 209 as compared to step 202 (e.g., one or more users may have provided reports about one or more emails), which may provide for a better analysis at step 209.

For example, the protection server module 112b of the message security computing platform 110 may scan an attachment for known viruses or other types of malware in response to a user report of a suspicious attachment, in response to a user reporting an email as spam, in response to a user reporting that the email appears to be sent by an impostor, and/or the like. If the message security computing platform 110 detects that the attachment has a virus or is otherwise a malicious attachment, the message security computing platform 110 may flag the message for one or more enforcement actions (e.g., quarantining, deletion, etc.). Additionally or alternatively, other messages from the same sender and/or other messages from related senders (e.g., other senders that use the same email domain) may be flagged for one or more enforcement actions (e.g., quarantining or deletion, adding of the sender to a blocklist, etc.).

As another example, the protection server module 112b of the message security computing platform 110 may use one or more machine learning models to analyze the email retrieved at step 209. For example, as described above with respect to step 202, the message security computing platform 110 may use a machine learning model to analyze whether an email was sent by an impostor and/or other flags indicating the email is suspicious. Although a machine learning model may be used at step 202 to predict whether an email was sent by an impostor and/or was otherwise suspicious, in some cases a larger and/or or more robust machine learning model (e.g., using more inputs, having more hidden layers in a deep neural network, etc.) may be used at step 209 in order to generate a more accurate prediction. For example, the machine learning model may use, as inputs, any textual information provided by the user that indicates why the email was reported (e.g., as provided to input box 455). Based on the more accurate determination that the email was sent by an impostor and/or otherwise suspicious, the message security computing platform 110 may flag the message, the sender, other related messages, and/or other related senders for one or more enforcement actions (e.g., quarantine or deletion of messages, blocking of senders, and/or the like).

As another example, the protection server module 112b of the message security computing platform 110 may access content by following any URLs in the flagged email (e.g., URLs reported as suspicious and/or other URLs) to retrieve whatever data is pointed to by the URLs, and the accessed content may be scanned and/or processed to determine whether it is malicious. For example, the message security computing platform 110 may access a URL embedded in an email, and a malicious web server may respond with an executable. The message security computing platform 110 may then analyze the executable to detect that it contains spyware, and therefore determine that one or more relevant enforcement actions (e.g., the email should be deleted and future emails from the sender should be blocked). As another example, the message security computing platform 110 may access a URL embedded in an email, and a malicious web server may respond with a page asking for financial account information about the user, which the message security computing platform 110 may analyze and detect as a malicious web page. One or more relevant enforcement actions may then be applied for the email, for other emails containing the same link (and/or a link pointing to the same domain name), for other emails from the same sender, for other emails from the same sender domain, and/or the like.

Additionally or alternatively, the message security computing platform 110 may analyze whether the email is malicious or not based in part on a reporter score for the user who reported the email. The message security computing platform 110 may thus maintain a reporter score for each user (e.g., each user associated with an email account managed by an email server 120) that reflects the user's ability to detect and report malicious email messages. For example, if a particular user previously reported several emails as malicious, and the message security computing platform 110 confirmed that each of the reported emails was malicious (e.g., by analyzing the content of the messages, detecting a link to a malicious website, etc.), then the message security computing platform 110 may assign a high reporter score to that user. As a contrasting example, if a different user previously reported several messages as malicious that the message security computing platform 110 did not determine were malicious and/or the message security computing platform 110 determined that the emails were not malicious, then the message security computing platform 110 may assign a low reporter score for that user. The message security computing platform 110 may then use the reporter score in part to determine whether a message reported by a particular user is malicious or not, and/or whether certain enforcement actions should be applied. For example, if the message security computing platform 110 is not able to determine whether an email is malicious or not, but the user that reported the email has a high reporter score, then the message security computing platform 110 may apply enforcement actions that it might not have applied had the reporter been associated with a lower score. In some cases, enforcement actions may only be applied if the message security computing platform 110 positively determines that the message is malicious and/or the reporter is associated with a certain minimum reporter score. Different enforcement actions may be associated with different minimum reporter scores, such that the message security computing platform 110 may compare a reporter score to a threshold requirement for a particular enforcement action before applying the enforcement action. The message security computing platform 110 may also adjust each user's reporter score up and down as more reports come in from the particular user and the message security computing platform 110 confirms whether the report was accurate or inaccurate.

At step 210, the message security computing platform 110 may apply the enforcement actions that were determined in step 209. For example, the message security computing platform 110 may add email addresses and/or domain names to blocklists and/or safelists. In some cases, the message security computing platform 110 may add the email address and/or domain name to a personal blocklist/safelist for the reporting user. Additionally or alternatively, the message security computing platform 110 may add the email address and/or domain name to an organization-wide blocklist or safelist, which may be stored as part of the organization-wide policy. In either case, the organization-wide and/or personal blocklists, safelists, and other such information may be stored in the database 112*d* of the message security computing platform 110. Thus, the message security computing platform 110 may edit database entries to implement the enforcement actions. The message security computing platform 110 may determine whether to add the email address and/or domain name to a particular blocklist based on a certainty that the email was harmful or abusive (e.g., if a machine learning model indicated with high certainty that the email was harmful), based on whether an organization policy indicates that the particular user can edit organization-wide safelists or blocklists (e.g., IT members of an organization may have permission to edit organization-wide safelists or blocklists), based on a reporter score associated with the reporting user (e.g., if a user's reporter score is above a threshold, the user may be able to edit a blocklist), and the like. In certain cases, thresholds may be lower for editing personal blocklists and/or safelists than for editing organization-wide blocklists and/or safelists. The message security computing platform 110 may be able to implement safelists and/or blocklists at the message security computing platform 110 without involving the email server 120 (e.g., it may block any incoming email from an address on a blocklist), and/or the message security computing platform 110 may send instructions to the email server 120 that cause the email server 120 to implement the safelists and/or blocklists.

In some cases, the message security computing platform 110 may also remove emails that were determined malicious and/or sent by blocked senders from other user's inboxes. For example, if the message security computing platform 110 determines that a particular email from a particular sender is malicious, it may remove any email from that user from the inbox of every user associated with the organization. Emails may be removed from inboxes by deletion, by quarantining (e.g., in a special sub-folder that a user may access), and/or using other techniques. Additionally or alternatively, the message security computing platform 110 may delete harmful attachments from an email in one or more user's inbox, remove harmful links from emails in one or more user's inbox, and/or the like. The message security computing platform 110 may thus send one or more commands for deleting, quarantining, and/or modifying emails to the organization email server 120, which may carry out the enforcement actions as specified by the command(s).

At step 211, the message security computing platform 110 may update the training data that was used to train any machine learning models based on the data generated according to the process of FIGS. 2A-2C. For example, inputs generated for a particular email as described above may be added as training inputs, and user reporting indicating the reasons why an email was suspicious and/or harmful may be used as training output(s), in order to update the training data set. At step 212, the message security computing platform 110 may re-train the machine learning models using the updated training data in order to improve the accuracy of the system. Thus, by using real world data to improve its training data and models, the message security computing platform 110 may be able to adapt to changing tactics and techniques used in attempts to circumvent policy enforcement.

In some instances, message security computing platform 110 may perform one or more additional steps that enable an enterprise organization to provide just-in-time cybersecurity training using email warning tags. For example, in instances in which an end user correctly identified and reports a malicious message that is actually a simulated phishing message or simulated attack message (which may, e.g., be delivered for cybersecurity training purposes), message security computing platform 110 may load, generate, and/or otherwise provide one or more micro-learning modules to the end user and/or the end user's computing device, where such micro-learning modules are tailored to the specific threat presented in the simulated phishing message or simulated attack message. So, for instance, if a user of user computing device 130A correctly identifies and reports a simulated spear-phishing message using an email warning tag embedded in the message, message security computing platform 110 may load, generate, and/or provide, to user computing device 130A, one or more micro-learning modules that include training content on recognizing and preventing spear-phishing attacks. In this way, the email warning tags described above may be incorporated into and/or support cybersecurity training applications and systems.

Figure 5:
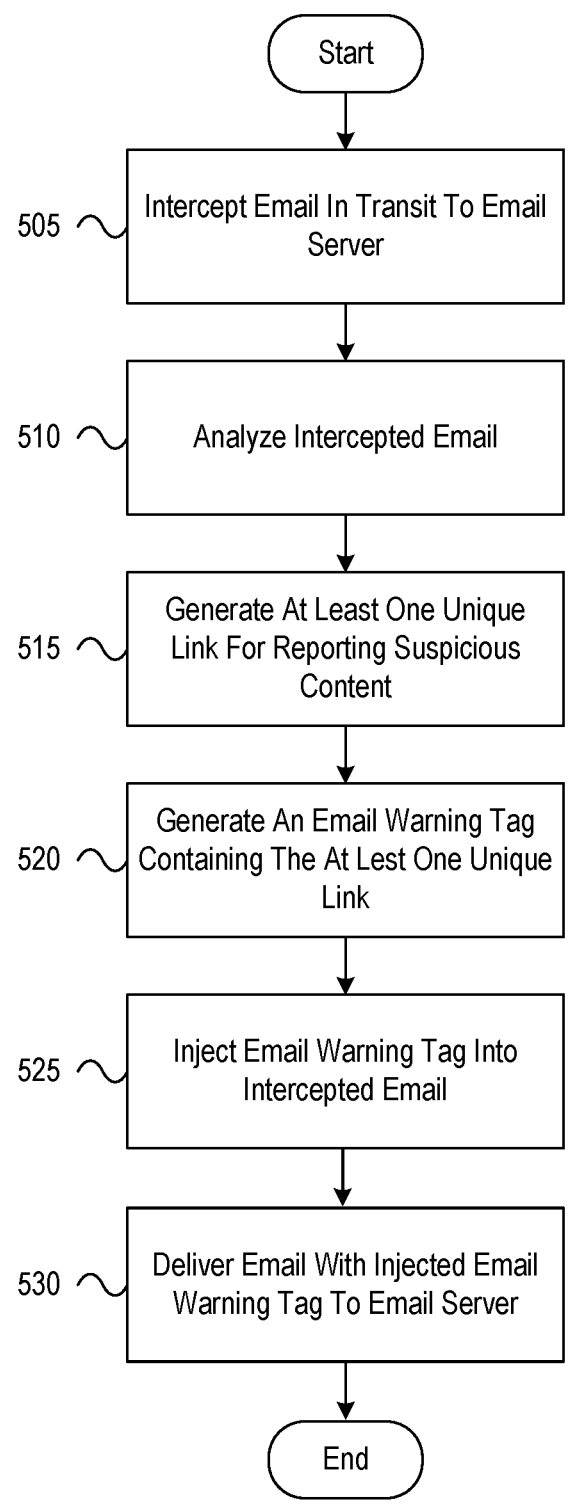
FIG. 5 depicts an illustrative method for providing interactive email warning tags and receiving interactive user email reports in accordance with one or more example embodiments.

FIG. 5 depicts an illustrative method for providing interactive email warning tags and receiving interactive user email reports in accordance with one or more aspects described herein. Referring to FIG. 5, at step 505, a message security computing platform having at least one processor, a communication interface, and memory may intercept an email in transit to an email server. At step 510, the message security computing platform may analyze the email using the one or more processors. At step 515, the message security computing platform may, based on the analyzing, generate at least one unique link for reporting suspicious content associated with the email. At step 520, the message security computing platform may, based on the analyzing, generate an email warning tag comprising text information and the at least one unique link for reporting the suspicious content associated with the email. At step 525, the message security computing platform may inject the email warning tag into the email to produce a modified email comprising content from the email and the email warning tag. At step 530, the message security computing platform may send the modified email comprising the content from the email and the email warning tag to the email server.

The analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   at a message security computing platform comprising a network interface, one or more processors, and memory storing computer readable instructions:
   intercepting, by the network interface, an email in transit to an email server;
   analyzing, by the one or more processors, the email, wherein the analyzing the email comprises:
   using a machine learning model to generate a suspicious email score based on features derived from the email,
   wherein the machine learning model is trained using a labeled training data set correlating features of training emails with labels indicating a suspicious email score of each training email;
   based on the analyzing:
   generating, by the one or more processors, at least one unique selectable link, wherein the at least one unique selectable link is selectable by a user for reporting suspicious content associated with the email; and
   generating, by the one or more processors, an email warning tag comprising text information and the at least one unique selectable link;
   injecting, by the one or more processors, the email warning tag into the email, wherein injecting the email warning tag into the email produces a modified email comprising content from the email and the email warning tag; and
   sending, via the network interface, the modified email comprising the content from the email and the email warning tag to the email server.

2. The method of claim 1, wherein the at least one unique selectable link comprises a first unique selectable link, the method further comprising:
- receiving, from a user device associated with an email address specified by the email, a selection of the first unique selectable link in the email warning tag;
- based on the selection, flagging the email as a malicious email; and
- based on flagging the email as a malicious email, removing the email from an inbox associated with the email address.

3. The method of claim 2, further comprising, based on flagging the email as a malicious email, removing other emails sent by a sender of the email from the inbox.

4. The method of claim 2, further comprising, based on flagging the email as a malicious email, removing other emails sent by a sender of the email from inboxes associated with other email addresses.

5. The method of claim 1, wherein the email warning tag is formatted according to a markup language, wherein the at least one unique link is associated with at least one button tag defined by the markup language.

6. The method of claim 1, wherein generating the at least one unique selectable link comprises generating values indicating one or more of:
- a unique identifier of the email;
- an identifier of a recipient address;
- an identifier of an analysis server; or
- an identifier of a reporting action.

7. The method of claim 1, wherein the at least one unique selectable link comprises a plurality of links including one or more of:
- a first link for reporting a spam email;
- a second link for reporting a phishing email;
- a third link for reporting a suspicious attachment; or
- a fourth link for adding a sender of the email to a blocklist.

8. The method of claim 1, wherein the at least one unique selectable link comprises a first link, the method further comprising:
- receiving, from a user device, a selection of the first link in the email warning tag;
- generating a webpage in response to the selection of the first link, wherein the webpage comprises one or more of:
  - a second link for reporting a spam email;
  - a third link for reporting a phishing email;
  - a fourth link for reporting a suspicious attachment;
  - a fifth link for adding a sender of the email to a safelist;
  - a sixth link for adding a sender of the email to a blocklist; or
  - a text box for providing more information about why a user reported the email; and
- sending the webpage to the user device.

9. The method of claim 1, wherein the at least one unique selectable link comprises a first link, the method further comprising:
- receiving a user selection of the first link;
- generating labeled training data based on the user selection of the first link; and
- re-training a machine learning model based on the labeled training data.

10. The method of claim 1, wherein the at least one unique selectable link comprises a first link, wherein the first link comprises an encrypted email identifier, the method further comprising:
- receiving, from a user device, a selection of the first link;
- decrypting the encrypted email identifier in the first link;
- requesting, from the email server, using the email identifier, the email;
- receiving the email;
- analyzing the email; and
- performing one or more enforcement actions based on the analyzing.

11. The method of claim 10, further comprising:
- identifying, based on information in the first link, a particular organization associated with the email; and
- retrieving an email policy associated with the organization,
- wherein the analyzing of the email is based on the email policy associated with the organization.

12. A computing platform comprising a network interface, one or more processors, and memory storing computer readable instructions that, when executed by the one or more processors, cause the computing platform to perform steps comprising:
- intercepting, by the network interface, an email in transit to an email server;
- analyzing, by the one or more processors, the email, wherein the analyzing the email comprises:
  - using a machine learning model to generate a suspicious email score based on features derived from the email,
  - wherein the machine learning model is trained using a labeled training data set correlating features of training emails with labels indicating a suspicious email score of each training email;
- based on the analyzing:
  - generating, by the one or more processors, at least one unique selectable link, wherein the at least one unique selectable link is selectable by a user for reporting suspicious content associated with the email; and
  - generating, by the one or more processors, an email warning tag comprising text information and the at least one unique selectable link;
- injecting, by the one or more processors, the email warning tag into the email, wherein injecting the email warning tag into the email produces a modified email comprising content from the email and the email warning tag; and
- sending, via the network interface, the modified email comprising the content from the email and the email warning tag to the email server.

13. The computing platform of claim 12, wherein the at least one unique selectable link comprises a first unique link, wherein the instructions, when executed by the one or more processors, further cause the computing platform to perform steps comprising:
- receiving, from a user device associated with an email address specified by the email, a selection of the first unique link in the email warning tag;
- based on the selection, flagging the email as a malicious email; and
- based on flagging the email as a malicious email, removing the email from an inbox associated with the email address.

14. The computing platform of claim 13, wherein the instructions, when executed by the one or more processors, further cause the computing platform to perform steps comprising:
- based on flagging the email as a malicious email, removing other emails sent by a sender of the email from the inbox.

15. The computing platform of claim 13, wherein the instructions, when executed by the one or more processors, further cause the computing platform to perform steps comprising:

based on flagging the email as a malicious email, removing other emails sent by a sender of the email from inboxes associated with other email addresses.

16. One or more non-transitory computer-readable media storing computer readable instructions that, when executed by one or more processors of a computing platform, cause the computing platform to perform steps comprising:

intercepting an email in transit to an email server;

analyzing, by the one or more processors, the email, wherein the analyzing the email comprises:

using a machine learning model to generate a suspicious email score based on features derived from the email, wherein the machine learning model is trained using a labeled training data set correlating features of training emails with labels indicating a suspicious email score of each training email;

based on the analyzing:

generating, by the one or more processors, at least one unique selectable link, wherein the at least one unique selectable link is selectable by a user for reporting suspicious content associated with the email; and generating, by the one or more processors, an email warning tag comprising text information and the at least one unique selectable link for reporting the suspicious content associated with the email;

injecting, by the one or more processors, the email warning tag into the email, wherein injecting the email warning tag into the email produces a modified email comprising content from the email and the email warning tag; and sending the modified email comprising the content from the email and the email warning tag to the email server.

17. The one or more non-transitory computer-readable media of claim 16, wherein the at least one unique selectable link comprises a first unique link, wherein the instructions, when executed by the one or more processors, further cause the computing platform to perform steps comprising:

receiving, from a user device associated with an email address specified by the email, a selection of the first unique link in the email warning tag;

based on the selection, flagging the email as a malicious email; and based on flagging the email as a malicious email, removing the email from an inbox associated with the email address.

18. The one or more non-transitory computer-readable media of claim 17, wherein the instructions, when executed by the one or more processors, further cause the computing platform to perform steps comprising:

based on flagging the email as a malicious email, removing other emails sent by a sender of the email from the inbox.

19. The method of claim 1, wherein the at least one unique selectable link includes identification of a server to analyze the email for suspicious content.

\* \* \* \* \*